US012746846B2

(12) United States Patent
DiLodovico et al.

(10) Patent No.: US 12,746,846 B2
(45) Date of Patent: Sep. 29, 2026

(54) AUTOMOTIVE NETWORK BUS MESSAGE SUPPRESSION FOR REDUCING BATTERY DRAIN

(71) Applicant: FORD GLOBAL TECHNOLOGIES, LLC, Dearborn, MI (US)

(72) Inventors: Steven T. DiLodovico, Grosse Pointe Farms, MI (US); Eric R. Paton, Sylvan Lake, MI (US); Cameron Kachur, Dearborn, MI (US); Stuart C. Salter, White Lake, MI (US)

( * ) Notice: Subject to any disclaimer, the term of this patent is extended or adjusted under 35 U.S.C. 154(b) by 16 days.

(21) Appl. No.: 18/964,803

(22) Filed: Dec. 2, 2024

(65) Prior Publication Data

US 2026/0152090 A1 Jun. 4, 2026

(51) Int. Cl.
*B60L 58/12* (2019.01)

(52) U.S. Cl.
CPC ........... *B60L 58/12* (2019.02); *B60L 2240/80* (2013.01)

(58) Field of Classification Search
None
See application file for complete search history.

(56) References Cited

U.S. PATENT DOCUMENTS

| | | | |
|---|---|---|---|
| 10,243,760 B2 | 3/2019 | Ochiai et al. | |
| 10,363,796 B2 | 7/2019 | DeCia et al. | |
| 10,608,447 B2 | 3/2020 | Varughese | |
| 11,157,291 B2 | 10/2021 | Käufl et al. | |
| 11,396,246 B2 | 7/2022 | Oestreich et al. | |
| 11,554,731 B2 | 1/2023 | Chen et al. | |
| 2010/0082198 A1* | 4/2010 | Arai | B60R 16/033 701/31.4 |

(Continued)

FOREIGN PATENT DOCUMENTS

| | | | |
|---|---|---|---|
| CN | 109756407 A | 5/2019 | |
| CN | 118849972 A * | 10/2024 | B60R 16/033 |
| CN | 118914892 A * | 11/2024 | G01R 31/378 |

(Continued)

OTHER PUBLICATIONS

English translation of CN-118849972-A, retrieved from Espacenet on Feb. 7, 2026 (Year: 2026).*

(Continued)

*Primary Examiner* — Amelia Vorce
(74) *Attorney, Agent, or Firm* — Frank Lollo; Eversheds Sutherland (US) LLP

(57) ABSTRACT

An electronic controller module in a vehicle is powered by a battery during a Key-Off state. The electronic controller module has a bus interface for transmitting messages to and receiving messages from a multiplex bus, wherein the messages include a periodic sequence of Network Management (NM) messages transmitted during a normal operating mode. A control circuit in the module is configured to detect an OFF state of the vehicle in which use of power from the battery is limited within the vehicle, detect a State of Charge (SOC) of the battery, and compare the detected SOC to a critical battery threshold. The control circuit is further configured to determine an elapsed time beginning when the OFF state is detected and the SOC is no longer above the critical battery threshold, and when the elapsed time is greater than a time threshold then the sequence of NM messages is inhibited.

17 Claims, 5 Drawing Sheets

(56) References Cited

U.S. PATENT DOCUMENTS

| | | | | |
|---|---|---|---|---|
| 2019/0379218 | A1* | 12/2019 | Varughese | B60R 16/03 |
| 2020/0282860 | A1* | 9/2020 | Kim | B60L 58/10 |

FOREIGN PATENT DOCUMENTS

| | | | | | |
|---|---|---|---|---|---|
| JP | 2000140138 | A | * | 5/2000 | B60Q 3/46 |
| KR | 20190067304 | A | * | 6/2019 | B60L 53/60 |

OTHER PUBLICATIONS

English translation of JP 2000140138 A, retrieved from Espacenet on Feb. 7, 2026 (Year: 2026).*

Thiyagaraj Anandan, SAE International J. Passeng. Cars—Electron Electr. Sys. / vol. 11, Issue 2 (Apr. 2018).

Specification of Network Management , Document ID 898: AUTOSAR AP Release 19-03.

* cited by examiner

| # Of Buses | Add On |
| --- | --- |
| 2 | 1 sec |
| 3 | 2 sec |
| 4 | 4 sec |

AUTOMOTIVE NETWORK BUS MESSAGE SUPPRESSION FOR REDUCING BATTERY DRAIN

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to bus communication between automotive electronic control units, and, more specifically, to control of bus messages during times when electronic control units should enter a sleep mode for preserving battery power reserves while a vehicle is turned off.

A typical automotive electrical system relies on a storage battery for starting an internal combustion engine (and/or closing the high voltage contactors for a hybrid vehicle) and for powering electrical accessories when the engine is not running. Many modern electronic vehicle systems operate continuously even when the vehicle is in a parked, unattended state while relying on the battery as the only available power source. Some electronic modules that must be powered at all times include those that perform functional operations while parked (e.g., antitheft systems and remote entry systems) and those that just need a reduced amount of power to maintain memory contents or monitor/measure various conditions or electrical communication signals (e.g., in a sleep mode). Other modules may continue to operate for a specified time after the driver shuts off the vehicle, but can be powered off after the specified time (e.g., courtesy lighting).

Since a vehicle may remain parked for long periods of time, it is important to limit battery drain so that a sufficient battery state-of-charge is still available to activate the vehicle (e.g., start a combustion engine in a gas-powered vehicle or close the main contactors in an electric or hybrid vehicle) when the user returns. The vehicle manufacturer usually specifies limits for the current drawn by various modules under each of the conditions which may arise. In particular, a Key-Off Load (KOL) strategy may be specified which sets quiescent current limits for the modules. Different KOL modes with different limits for different modules may apply based on (i) the time that the vehicle ignition switch has been OFF for a respective period of time and there has been no user activity, and/or (ii) the state of charge of the battery. The sum of all the quiescent currents is intended to be sufficiently low to extend the ability to activate the vehicle for a sufficiently long time. Nevertheless, the potential remains for the battery to become depleted and unable to start the engine/activate the hybrid after some period of time.

Whenever a battery becomes discharged and fails to activate the vehicle even though the time that the vehicle sat idle was shorter than the length of time that can be handled by a healthy battery, it is common for the battery to be replaced on the assumption that the battery is defective. However, a dead battery may sometimes be caused by software glitches which resulted in a failure to reduce the battery drain down to the quiescent levels. For example, if one or more of electronic modules are awake during times when they should have entered a sleep mode, this could lead to a prematurely dead battery. The software glitches may not represent a permanent failure, and they may be difficult to detect because the software operation may fully recover after the next ignition cycle. Therefore, the battery may be replaced unnecessarily.

Serial multiplex communication between electronic modules disposed within a vehicle has been widely adopted. For example, the Controller Area Network (CAN) is a frequently used communications protocol which efficiently supports distributed real-time control with a high level of reliability. Interconnected modules have included engine control units, infotainment modules, navigation components, sensor units (e.g., cameras, radars, ultrasonics), antilock braking systems, electric power steering systems, and other systems. A CAN bus interconnecting these modules can have a bit rate up to 1 Mbit/s. The use of multiplex systems may reduce the size of the wiring harness while improving communication speed and flexibility.

A twisted pair of wires can be used to form a multiplex (e.g., CAN) bus which interconnects bus transceivers in the respective nodes (i.e., control units or modules). Each module derives its power from a power line (e.g., extending from a power distribution box) carrying a DC supply voltage (e.g., 12 VDC). Each module is capable of entering one or more low-power modes, such as a ready-to-sleep mode and a sleep (fully off) mode. Each particular module includes its own specific programming based on the functions to be performed and the conditions under which the module must be awake or can enter a low-power mode. Before actually entering a sleep mode, it is typical practice that a module assumes a ready-to-sleep mode in which at least some functions (including bus message transmission and reception) are maintained. For example, the Autosar open system architecture provides that modules in an awake mode will periodically transmit Network Management (NM) messages during times that it needs other modules on the same bus to remain awake and available. When a particular module detects conditions under which it should be able to go to sleep, it enters the ready-to-sleep mode and monitors for NM messages which indicate that it needs to defer its full sleep mode. Only after there are no more NM messages for a specified period of time will the module go into a powered down state (e.g., a sleep mode or a fully off condition).

Whenever a software glitch or other error prevents one module from properly entering its powered down state, it may continue to transmit NM messages which keep other modules receiving those NM messages from leaving their ready-to-sleep mode. Thus, the error in one module has a cascade effect in which the power drain remains high during a time when all or most of the modules should be asleep.

SUMMARY OF THE INVENTION

In one aspect of the invention, an electronic controller module is provided for a vehicle wherein the vehicle includes a battery for powering the electronic controller module. The electronic controller module has a bus interface for transmitting messages to and receiving messages from a multiplex bus, wherein the messages include a periodic sequence of Network Management (NM) messages transmitted during a normal operating mode. A control circuit is configured to detect an OFF state of the vehicle in which use of power from the battery is limited within the vehicle, detect a State of Charge (SOC) of the battery, and compare the detected SOC to a critical battery threshold. The control circuit is further configured to determine an elapsed time beginning when the OFF state is detected and the SOC is no longer above the critical battery threshold, and when the elapsed time is greater than a time threshold then the sequence of NM messages is inhibited (i.e., suspended or blocked).

DETAILED DESCRIPTION OF PREFERRED EMBODIMENTS

Figure 1:
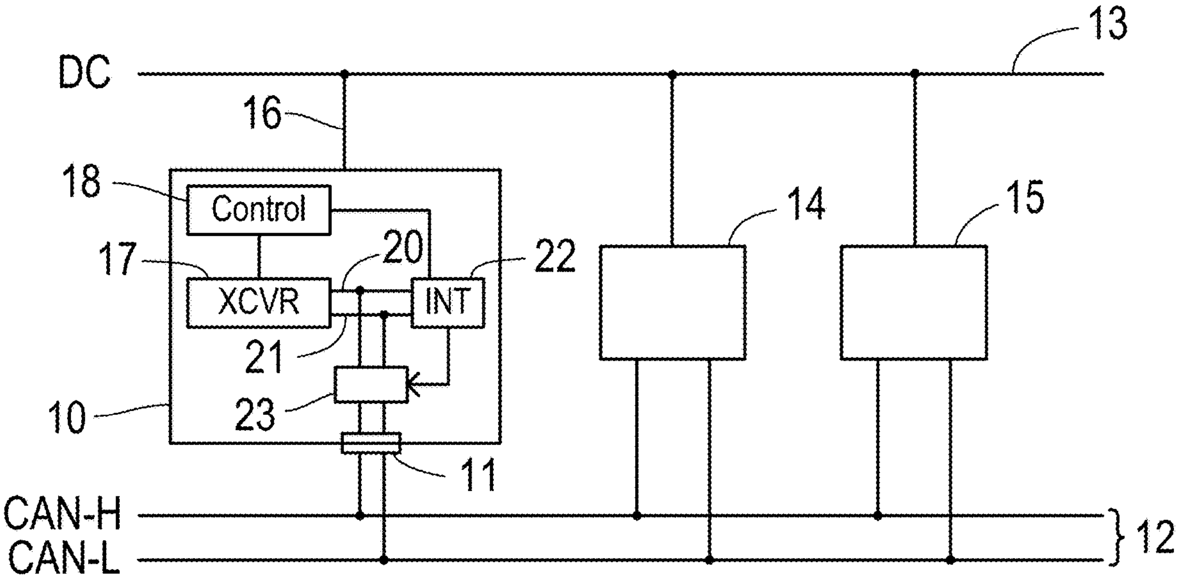
FIG. 1 is a schematic diagram showing electronic modules coupled by a CAN bus.

FIG. 1 shows a multiplex network wherein an electronic control unit or module 10 is connected via a connector 11 to a CAN multiplex bus 12 which includes a twisted wire pairs of wires labeled CAN-H and CAN-L. A DC power line 13 supplies DC electrical power to module 10 and to modules 14 and 15, each of which includes the same multiplex functionality as shown for module 10.

Module 10 receives and utilizes DC power via a wired connection 16. A bus transceiver 17 works together with a CAN controller 18. Bus transceiver 17 has output terminals 20 and 21 for transmitting or receiving complementary signals following a CAN protocol. Output terminals 20 and 21 are connected to an interface circuit 22 and to an isolator circuit 23. Isolator circuit 23 is normally in a non-isolating state which allows CAN bus messages to flow between bus 12 and bus transceiver 17. FIG. 1 shows one example embodiment for preventing the transmission of NM messages under predetermined conditions. For example, when controller 18 detects these predetermined conditions then it may provide a signal to interface circuit 22 which then reconfigures isolator 51 to block outgoing messages from transceiver 17. In some alternate embodiments, controller 18 may instead include software instructions that prevent any such NM messages from being initiated under the predetermined conditions.

Figure 2:
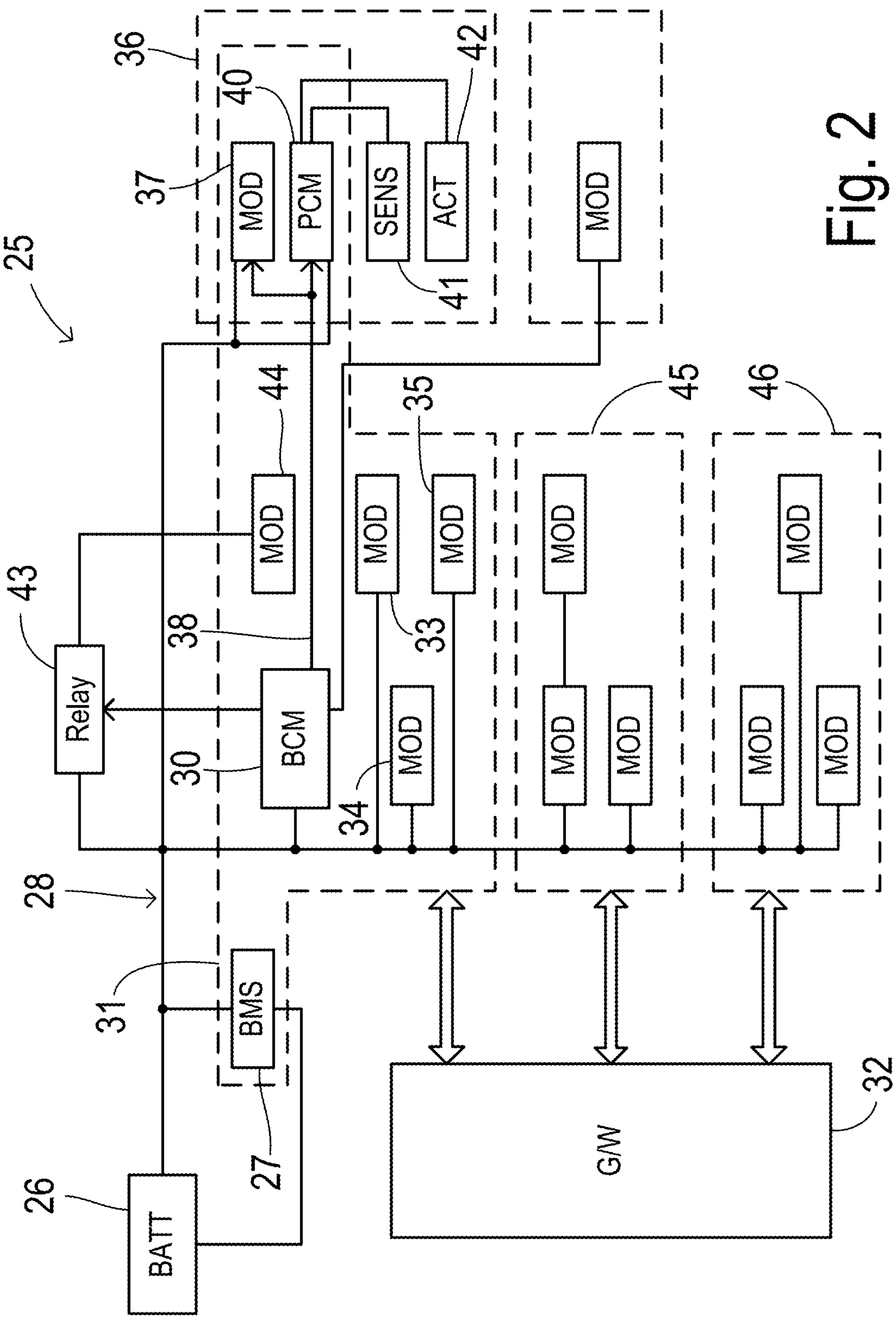
FIG. 2 is a block diagram showing one embodiment of an electrical architecture for distributing electrical power and multiplex communication signals, wherein KOL power management is implemented.

FIG. 2 shows an example of power distribution within an electrical system 25 having a storage battery 26 connected to a battery monitoring system (BMS) 27. BMS 27 may be a conventional component which, among other things, measures battery current flow passing from battery 26 to the electrical loads. A body control module (BCM) 30 and BMS 27 are both contained within and communicate over a bus network 31, such as a CAN bus. Bus communication lines (not shown) for bus network 31 loop between BMS 27, BCM 30, modules 30, 33-35, 37, and 44, and a powertrain control module (PCM) 40. Bus network 31 interconnects with a gateway 32 which further connects with additional bus networks 45 and 46 which may operate using the same or different protocols. When different, gateway 32 re-formats and passes messages between networks so that modules in different bus networks can exchange communication signals as known in the art. A power bus 28 distributes an output of battery 26 to various modules including BCM 30 and many other modules, including modules 33-35 which are interconnected by bus network 31. Module 37 and PCM 40 are controlled by BCM 30 to use battery power as a separate sub-net 36. Control messages from BCM 30 may also include commands which control power delivery to subordinate components of a control module (e.g., sensors 41 and actuators 42 which receive their power through PCM 40).

In another example of power management, PCM 30 is connected to a relay 43 which receives power from power bus 28 and selectably transmits power to a module 44. Relay 45 can, for example, be comprised of an ignition relay. Module 44 is further connected with bus network 31. Relay 43 may be controlled by a direct signal connection with BCM 30 or alternatively via a multiplex message. However, rather than having a sleep mode, module 46 is either fully powered or fully depowered according to the ON/OFF state of relay 45. On the other hand, most of the modules (including modules 33-35 and modules 37 and 40 in sub-net 36) are powered at all times from power bus 28, but each invokes a respective reduced-power mode such as a sleep state when needed.

Figure 3:
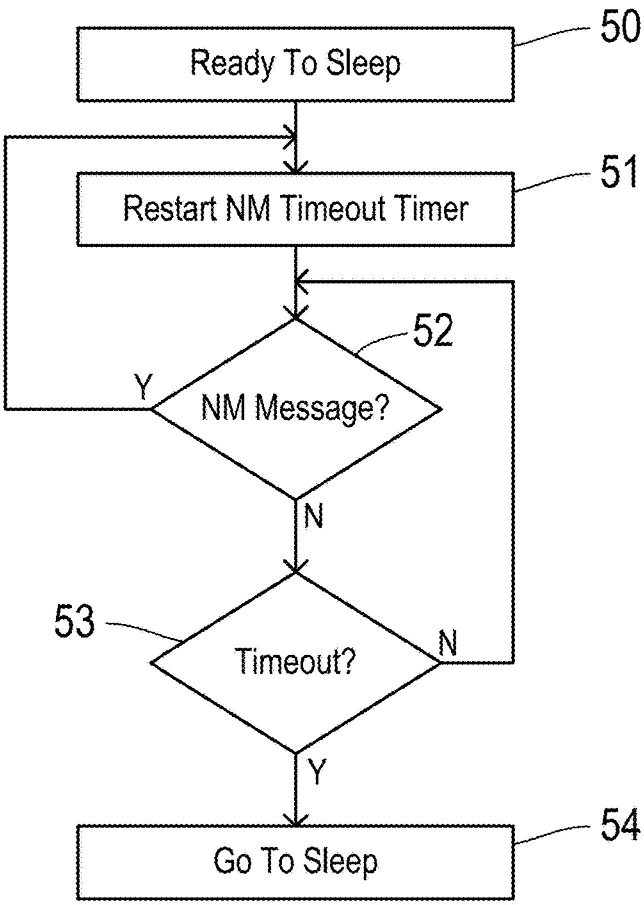
Fig. 3 (Prior Art)
FIG. 3 is a flowchart showing a method used by a module for monitoring NM messages and entering a sleep mode when appropriate.

During times when a vehicle ignition switch is ON or in an ACCESSORY state, electronic control units coupled to a multiplex bus may typically be awake (i.e., in a power-up mode). For network management purposes and to coordinate a powering down into respective sleep modes for different modules according to a KOL strategy, each module may be required to broadcast regular Network Management (NM) messages to all other nodes on the bus while awake. A module may transmit a periodic sequence of NM messages at a predetermined frequency (e.g., a heartbeat) of several Hertz, for example. Typically, modules are programmed to recognize when circumstances indicate that they should attempt to enter a reduced-power mode (e.g., a sleep mode). Once this is recognized, the modules may enter a ready-to-sleep mode in which the module listens for NM messages broadcast by other modules on the bus (no messages are transmitted by a module in the ready-to-sleep mode). FIG. 3 shows a procedure operating in a module which has entered a ready-to-sleep mode in step 50. In step 51, a NM timeout timer is started (or restarted) which is used to determine an elapsed time since the last NM message was received. In step 52, a check is performed to determine whether an NM message is detected. If an NM message is detected then the NM timeout timer is restarted in step 51. If no NM message was detected then a value of the timeout timer is compared to a predetermined time threshold (e.g., 90 seconds). If less than the threshold, then a return is made to step 52 to monitor for an NM message. Once the elapsed time exceeds the threshold, the module transitions to a sleep mode in step 54. By delaying the sleep mode in all the modules on a bus, each module which is actively communicating on the bus has the ability to complete its message sequence before an entire group of modules on a bus all go to sleep mode.

Thus, only when there have been no NM messages received for a threshold period of time will a module proceed to its sleep mode (in which it stops monitoring for bus messages). Whenever one particular module fails to properly enter its ready-to-sleep mode then it would continue broadcasting its NM messages, and these messages would prevent other modules which are in their ready-to-sleep mode from transitioning to their sleep modes. Under these circumstances, battery power is consumed at a rate which is higher than intended under the KOL strategy.

The invention helps ensure that a module experiencing a fault which would otherwise prevent it from the cessation of its continued broadcast of NM messages will nevertheless stop the NM messages and allow other modules to proceed to their sleep modes. To avoid becoming the module which erroneously keeps other modules from entering their sleep modes, a watchdog type of procedure is incorporated into the operation of a module. The procedure may preferably be comprised of programming instructions in each module which are configured to stop the module from broadcasting NM messages under certain trigger conditions. These trigger conditions may include one of more of (1) battery State of Charge is below a predetermined percentage, (2) ignition status is OFF, and (3) a duration of time for which NM messages have been broadcast is greater than a time threshold. In particular, a trigger condition may be comprised of the battery SOC being less than a predetermined percentage (e.g., 40%) or falling at a certain rate after being less than a somewhat higher threshold (e.g., a 2% drop in SOC within one hour once the SOC has dropped below 55%). Preferably, all of conditions 1-3 may have to be true in order to halt the NM messages. In some embodiments, a fourth trigger condition is utilized which requires the absence of any exceptional conditions which override the concern for preserving battery power. Exceptional conditions (i.e., conditions which except a module from the need to halt its NM messages) may include times in which the particular module is part of any features which should be allowed to run the battery down to zero charge, such as flashing of external signaling (caution) lights, operation of a wireless transceiver, or vehicle security (e.g., door lock operation). Once a module has determined that NM messages are to be halted, then the suspension of broadcasting NM messages preferably lasts until the next normal waking up of the network bus.

Figure 4:
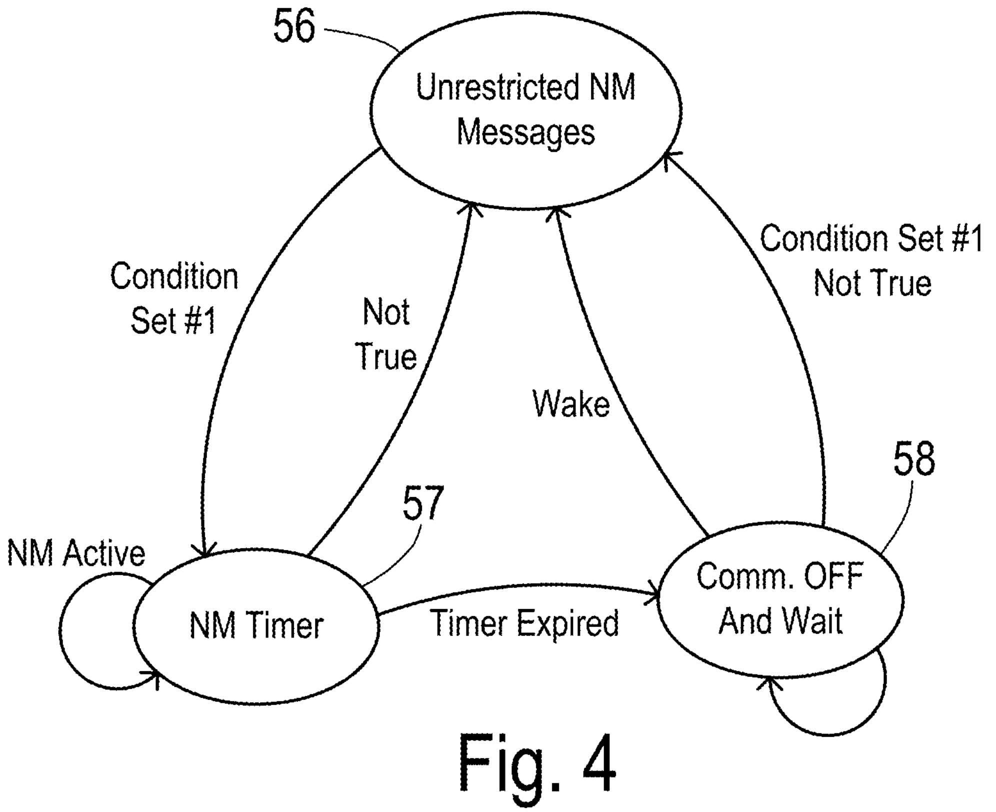
FIG. 4 is a State diagram showing one embodiment of a process of selectively interrupting the transmission of NM messages.

FIG. 4 shows a State diagram illustrating operation of a controller module according to an embodiment of the invention. The module is initially in a State 56 in which broadcasting of NM messages is unrestricted. Upon occurrence of a set of trigger conditions (designated as Condition Set #1) occurs, then a transition is made to a State 57 in which a timer is operated for detecting whether the broadcasting of NM messages persists for longer than a time threshold (e.g., about 5 seconds). Condition Set #1 may be comprised of the vehicle being OFF (i.e., inactive and/or unoccupied) and the battery SOC being less than a critical threshold. For as long as Condition Set #1 remains true and broadcasting of NM messages remains active, then State 57 is sustained. If Condition Set #1 becomes no longer true then a transition is made back to State 56. If the timer expires in State 57 then a transition is made to State 58. When in State 58 communication is cut off so that NM messages are halted. The module controller waits in State 58 until an external wake-up action or operation is detected, at which point a transition is made back to State 56. Likewise, if any of the aspects of Condition Set #1 become not true (e.g., the vehicle ignition switch is turned on) then a transition is made back to State 56.

Figure 5:
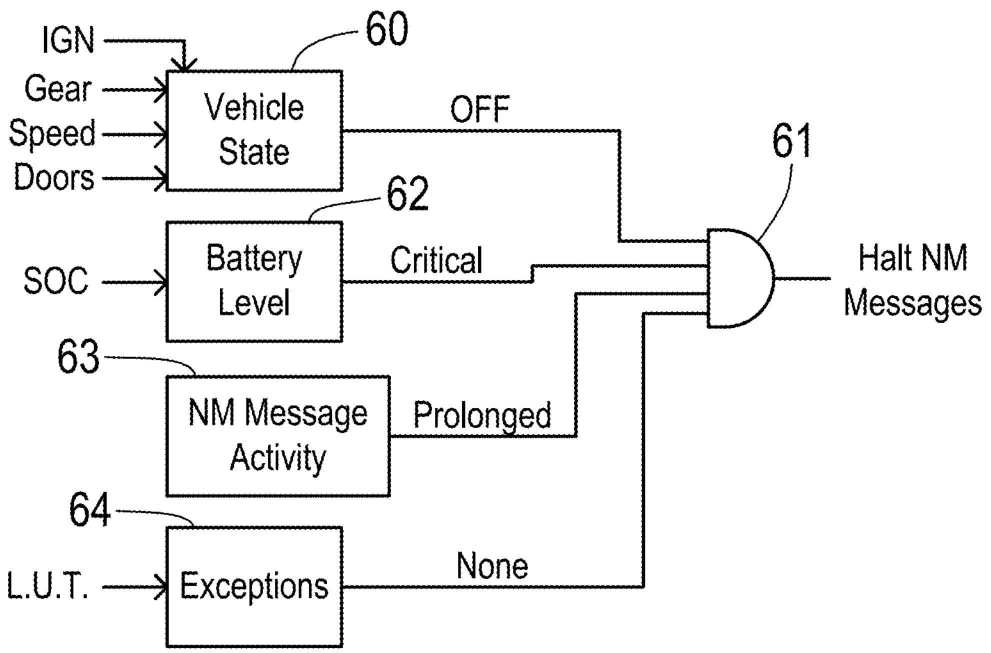
FIG. 5 is a block diagram showing a control arrangement for selectably halting NM messages according to one embodiment of the invention.

FIG. 5 shows logic circuitry for determining when to halt NM message transmissions. A vehicle-state logic block 60 determines a vehicle state using ignition switch status (ON or OFF), gear selector position (Park or not in Park), vehicle speed (motionless or not), or door status (open or closed). If all these factors are consistent with the vehicle being in an inactive state then a high logic level signal is sent from block 60 to an input of an AND-gate 61. A battery-level logic block 62 compares a SOC value from a battery monitor with a predetermined battery percentage representing a critical battery level. A high logic level signal is sent from battery-level logic block 62 to another input of AND-gate 61 when the battery SOC is at or below the critical level. A message-activity logic block 63 compares a duration of time for which NM messages have been cycling following the detection of both the critical battery level and the vehicle state being OFF. When the duration of time is longer than the time threshold then a high logic level signal indicating a prolonged duration of NM message activity is sent from logic block 63 to another input of AND-gate 61. An exception logic block 64 may utilize a lookup table or other electronic resources (e.g., available via the multiplex bus) to determine whether any exceptional conditions exist. If none are present then a high logic level signal is sent to another input of AND-gate 61. When all four inputs to AND-gate 61 are at a high logic level then a high logic level output is provided from AND-gate 61 which can be utilized to adopt a state within the controller module which prevents the sending of NM messages on the multiplex bus until either a wake-up of the full bus system occurs or a change in the vehicle occurs which causes one of the original conditions to being not true.

Figure 6:
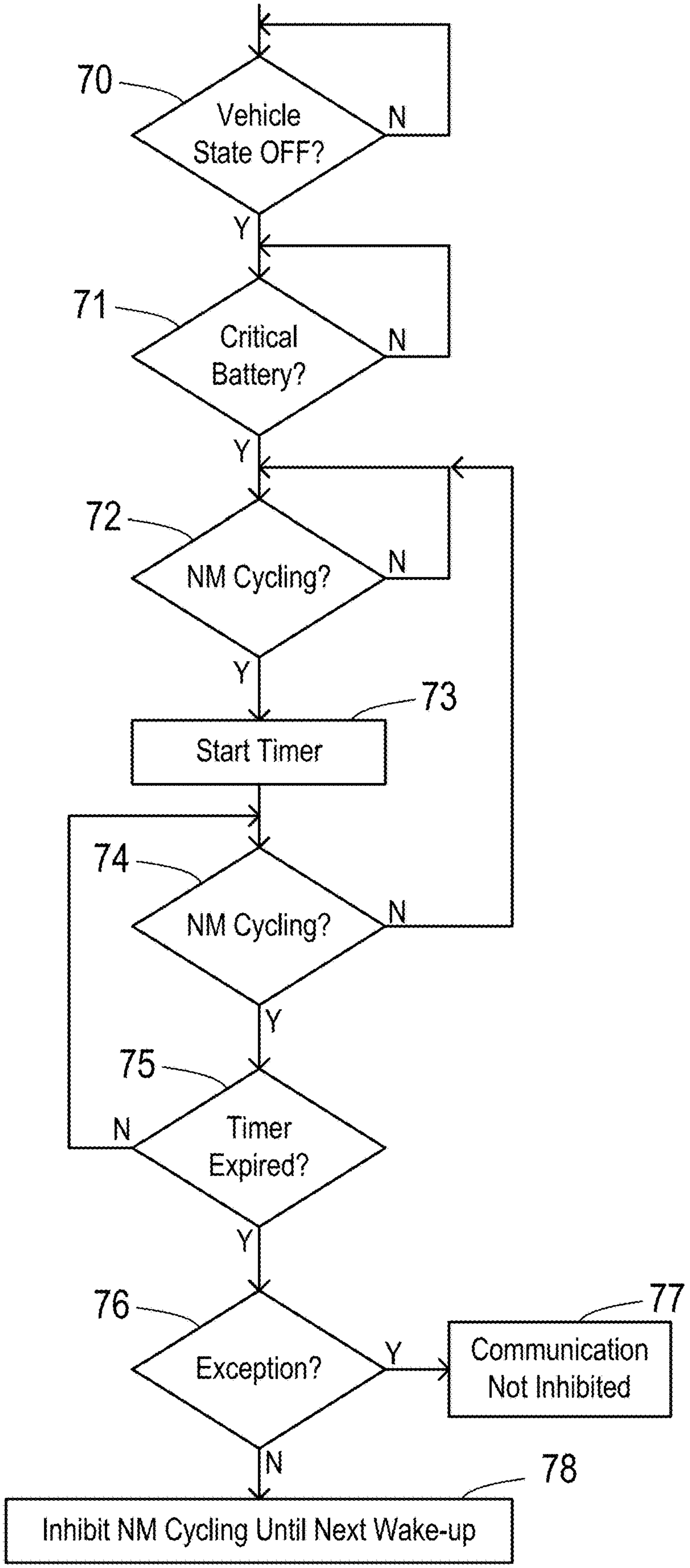
FIG. 6 is a flowchart showing one preferred embodiment of the invention.

FIG. 6 shows a method of the invention in which a particular module connected to a multiplex bus determines whether or not to send regular NM messages while it is awake. In step 70, a check is made to determine whether the vehicle state is OFF. An OFF state may be predicated on the position of an ignition switch being OFF (which may also be verified by determining that the vehicle is motionless with a zero speed or the transmission gear selector being in a Park position). Once step 70 detects that the vehicle state is OFF then a check is performed in step 71 to determine whether the battery state of charge has reached a critical level, (e.g., below a predetermined percentage). If a critical battery level is not detected and the vehicle remains in an OFF state then the battery level is repeatedly rechecked in step 71. Once the battery SOC drops below the critical level then a check is performed in step 72 to determine whether the module is in a normal operation (awake) state with regular cycling of NM messages. As long as NM messages are not cycling then the module is not preventing other modules from going to sleep and no action needs to be taken. If NM message cycling is present then a timer is started in step 73. A timeout threshold of the timer may be about 5 seconds or other time period (e.g., in a range from about 2 seconds to 10 seconds) which is selected to help ensure that any legitimate ongoing communication function needed by the module has time to complete before a message suspension is begun.

A check is performed in step 74 to determine whether the NM message cycling continues. If so then a check is performed in step 75 to determine whether the timer has expired. If an expiration of the timer is detected in step 75 then a check is performed in step 76 to determine whether any overriding exception is present. If an exception is detected (the e.g., the particular module is involved in performing a feature with high priority that should be allowed to continue regardless of battery SOC), then the communication is not inhibited in step 77. Otherwise, NM message cycling is inhibited in step 78. Preferably, NM messages continue to be inhibited until the next occurrence of a bus wake-up event or until one of the trigger conditions changes, such as the ignition switch transitioning to an ON state.

Figures 7, 8:
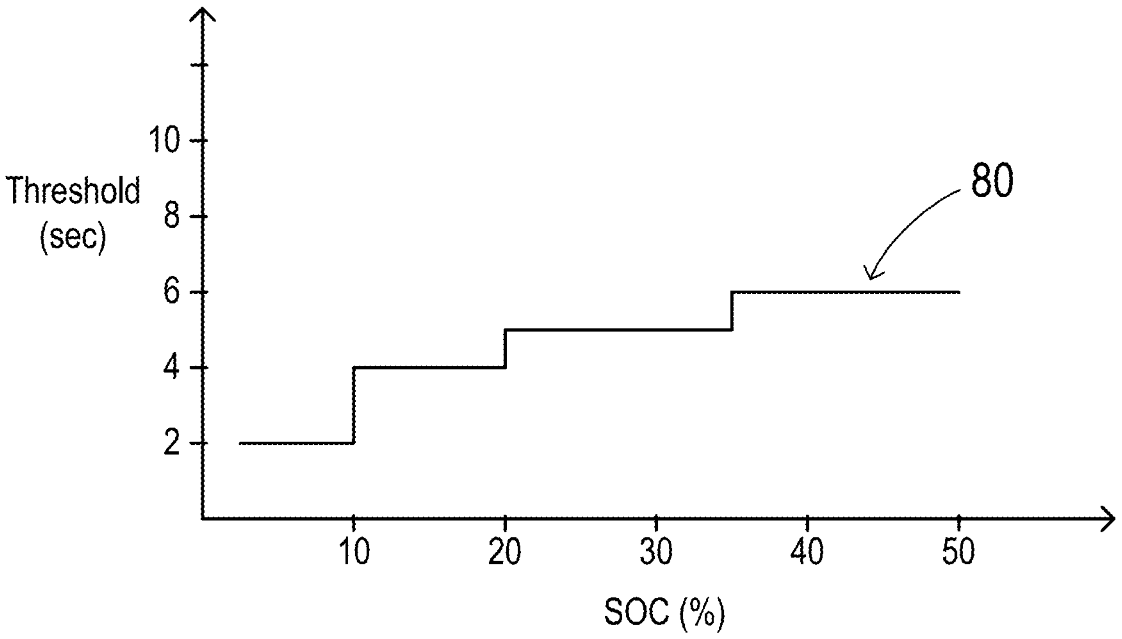
FIG. 7 is a graphic plot showing a variable time threshold which is selected according to a battery State of Charge.
FIG. 8 is a table showing incremental add-ons to the variable time threshold according to a number of separate sub-networks with which a module can communicate.

As mentioned above, the time threshold for which NM message cycling has endured may be about 5 seconds. In some embodiments, the time threshold may be a dynamic parameter which changes in response to different levels of battery SOC. FIG. 7 illustrates a relationship 80 between a threshold time and battery SOC wherein as battery state of charge becomes ever lower, the threshold time becomes shorter in order to better enable other modules on a multiplex circuit to transition sooner from a ready-to-sleep mode to a sleep mode. Similarly, an age of the battery or a state of health (SoH) of the battery can be utilized to further adjust a time threshold. For example, a shorter time threshold may be adopted when the age of the battery increases.

On the other hand, a longer time threshold may be useful in the event that there are several multiplex buses communicating via gateways since message propagation between nodes on different bus segments may take a longer time. As shown in FIG. 8, an incremental add-on may be included in the time threshold according to a number of buses which may be present within a particular vehicle's multiplex network. The add-on time increment may be proportional to the number of bus segments. For example, when there are two interconnected buses then the time threshold may be increased by 1 second, and when four buses are present then the time increment may be comprised of a 4 second add-on.

What is claimed is:

1. An electronic controller module for a vehicle wherein the vehicle includes a battery for powering the electronic controller module, the electronic controller module comprising:

a bus interface for transmitting messages to and receiving messages from a multiplex bus, wherein the messages include a periodic sequence of Network Management (NM) messages transmitted during a normal operating mode; and a control circuit coupled with the bus interface configured to:

detect an OFF state of the vehicle in which use of power from the battery is limited within the vehicle;

detect a State of Charge (SOC) of the battery; and compare the detected SOC to a critical battery threshold;

wherein the control circuit is further configured to:

determine an elapsed time beginning when the OFF state is detected and the SOC is no longer above the critical battery threshold; and when the elapsed time is greater than a time threshold then inhibit the periodic sequence of NM messages, wherein the time threshold is dynamically determined in response to the detected SOC.

2. The electronic controller module of claim 1 wherein the sequence of NM messages remains inhibited until the control circuit detects an external wake-up action.

3. The electronic controller module of claim 1 wherein the control circuit is further configured to prevent inhibiting the periodic sequence of NM messages when an exceptional condition is present which is permitted to consume battery power below the critical battery threshold.

4. The electronic controller module of claim 1 wherein the time threshold is in a range of from 2 seconds to 10 seconds.

5. The electronic controller module of claim 1 wherein the time threshold is determined according to a relationship wherein a decrease in the detected SOC corresponds to a shorter time threshold.

6. The electronic controller module of claim 1 wherein when the multiplex bus interconnects through at least one gateway to another bus segment, then the time threshold includes an add-on time increment.

7. The electronic controller module of claim 6 wherein the add-on time increment is proportional to a number of bus segments interconnected with the multiplex bus.

8. The electronic controller module of claim 1 wherein the OFF state is detected in response to an OFF position of an ignition switch of the vehicle.

9. A transportation vehicle comprising:

a battery;

a multiplex bus; and an electronic controller module powered by the battery, wherein the electronic controller module comprises:

a bus interface for transmitting messages to and receiving messages from the multiplex bus, wherein the messages include a periodic sequence of Network Management (NM) messages transmitted during a normal operating mode of the electronic controller module; and a control circuit coupled with the bus interface configured to (A) detect an OFF state of the vehicle in which use of power from the battery is limited within the vehicle, (B) detect a State of Charge (SOC) of the battery, and (C) compare the detected SOC to a critical battery threshold, (D) determine an elapsed time beginning when the OFF state is detected and the SOC is no longer above the critical battery threshold, and (E) when the elapsed time is greater than a time threshold then inhibit the periodic sequence of NM messages, wherein when the multiplex bus interconnects through at least one gateway to another bus segment, then the time threshold includes an add-on time increment.

10. The transportation vehicle of claim 9 wherein the periodic sequence of NM messages remains inhibited until the control circuit detects an external wake-up action.

11. The transportation vehicle of claim 9 wherein the control circuit is further configured to prevent inhibiting the periodic sequence of NM messages when an exceptional condition is present which is permitted to consume battery power below the critical battery threshold.

12. The transportation vehicle of claim 9 wherein the time threshold is in a range of from 2 seconds to 10 seconds.

13. The transportation vehicle of claim 9 wherein the time threshold is dynamically determined in response to the detected SOC.

14. A method of operating an electronic controller module for a vehicle wherein the vehicle includes a battery for powering the electronic controller module, the method comprising the steps of:

transmitting messages to and receiving messages from a multiplex bus, wherein the messages include a periodic sequence of Network Management (NM) messages transmitted during a normal operating mode;

detecting an OFF state of the vehicle in which use of power from the battery is limited within the vehicle;

detecting a State of Charge (SOC) of the battery;

comparing the detected SOC to a critical battery threshold;

determining an elapsed time beginning when the OFF state is detected and the SOC is no longer above the critical battery threshold; and when the elapsed time is greater than a time threshold then inhibit the periodic sequence of NM messages, wherein the time threshold is dynamically determined in response to the detected SOC.

15. The method of claim 14 wherein the inhibiting of the periodic sequence of NM messages is prevented when an exceptional condition is present which is permitted to consume battery power below the critical battery threshold.

16. The method of claim 14 wherein the time threshold is in a range of from 2 seconds to 10 seconds.

17. The method of claim 14 wherein when the multiplex bus interconnects through at least one gateway to another bus segment, then the time threshold includes an add-on time increment.

* * * * *